(12) United States Patent
Tilton et al.

(10) Patent No.: US 11,741,364 B2
(45) Date of Patent: Aug. 29, 2023

(54) DEEP NEURAL NETWORKS MODELING

(71) Applicant: Sponsorhouse, Inc., San Diego, CA (US)

(72) Inventors: Scott Tilton, Cardiff, CA (US); Robert J. Kraus, Encinitas, CA (US); Adam Smith, San Diego, CA (US); Michael Robinson, Del Mar, CA (US); Esther Walker, San Diego, CA (US); Garrison Hess, Solana Beach, CA (US)

(73) Assignee: HOOKIT, LLC, San Diego, CA (US)

( * ) Notice: Subject to any disclaimer, the term of this patent is extended or adjusted under 35 U.S.C. 154(b) by 1034 days.

(21) Appl. No.: 16/380,724

(22) Filed: Apr. 10, 2019

(65) Prior Publication Data

US 2019/0311268 A1    Oct. 10, 2019

Related U.S. Application Data

(60) Provisional application No. 62/655,676, filed on Apr. 10, 2018.

(51) Int. Cl.
*G06Q 30/02* (2023.01)
*G06N 3/084* (2023.01)
(Continued)

(52) U.S. Cl.
CPC ......... *G06N 3/084* (2013.01); *G06Q 30/0201* (2013.01); *G06Q 50/01* (2013.01)

(58) Field of Classification Search
CPC ..... G06N 3/084; G06Q 30/0201; G06Q 50/01
See application file for complete search history.

(56) References Cited

U.S. PATENT DOCUMENTS

| 8,681,630 B1 | 3/2014 | Gibson | G06F 9/54 |
| 9,002,920 B2 | 4/2015 | Deryugin et al. | H04M 3/5175 |

(Continued)

FOREIGN PATENT DOCUMENTS

| CN | 108229804 A | * 6/2018 | ....... G06Q 10/06393 |
| WO | WO 2014/153222 |  9/2014 | ............. G06F 17/30 |
| WO | WO 2014/183089 | 11/2014 | ............. G06F 19/00 |

OTHER PUBLICATIONS

H. Phan, L. Hertel, M. Maass, P. Koch, R. Mazur and A. Mertins, "Improved Audio Scene Classification Based on Label-Tree Embeddings and Convolutional Neural Networks," Jun. 2017, IEEE/ACM Transactions on Audio, Speech, and Language Processing, vol. 25, No. 6, pp. 1278-1290 (Year: 2017).*

(Continued)

*Primary Examiner* — E Carvalho
(74) *Attorney, Agent, or Firm* — Hayes Soloway P.C.

(57) ABSTRACT

A promotion value model uses deep neural networks to learn to calculate the promotion value of a commercial brand. The model determines and reports the promotion value of a plurality of electronic media files each containing at least one commercial brand indicator. The learned model identifies the electronic media files and determines at least one context for each of the at least one commercial brand indicators. Promotion value is modeled with a deep neural network that maps the context for each of the commercial brand indicators to feature vectors mapped to an input layer of the neural network. Network parameters are learned to indicate relative weighted values between transitions of the layers of the neural network.

8 Claims, 4 Drawing Sheets

(51) Int. Cl.
  *G06Q 50/00* (2012.01)
  *G06Q 30/0201* (2023.01)

(56) References Cited

U.S. PATENT DOCUMENTS

| | | | |
|---|---|---|---|
| 9,020,965 B1 | 4/2015 | Sehrer | G06F 17/30 |
| 9,405,597 B1 | 8/2016 | Luff et al. | G06F 21/44 |
| 9,875,440 B1 | 1/2018 | Commons | G06N 3/08 |
| 2002/0198766 A1 | 12/2002 | Magrino | G06Q 10/06 |
| 2006/0042483 A1 | 3/2006 | Work | G06Q 10/00 |
| 2009/0319436 A1 | 12/2009 | Andra | G06F 17/2785 |
| 2010/0121857 A1 | 5/2010 | Elmore et al. | G06F 17/30 |
| 2011/0173214 A1 | 7/2011 | Karim | G06F 17/30 |
| 2013/0073389 A1 | 3/2013 | Heath | G06F 15/16 |
| 2013/0110567 A1 | 5/2013 | Omar | G06Q 10/06 |
| 2013/0218310 A1 | 8/2013 | Johnson | G06F 17/60 |
| 2014/0156372 A1 | 6/2014 | Postrel | G06Q 30/0226 |
| 2014/0280209 A1 | 9/2014 | Kivirauma et al. | G06F 17/3089 |
| 2014/0289057 A1 | 9/2014 | Kowal et al. | G06Q 20/0277 |
| 2014/0349750 A1 | 11/2014 | Thompson et al. | A63F 13/12 |
| 2015/0120717 A1 | 4/2015 | Kim et al. | G06F 17/3053 |
| 2015/0120721 A1 | 4/2015 | Kim et al. | G06F 17/30 |
| 2015/0363688 A1* | 12/2015 | Gao | G06N 3/0454 706/27 |
| 2016/0019599 A1 | 1/2016 | Puntoriero | G06Q 30/0275 |
| 2016/0048754 A1 | 2/2016 | Wang et al. | G06N 3/04 |
| 2016/0213994 A1 | 7/2016 | Tilton et al. | A63B 71/00 |
| 2017/0068982 A1 | 3/2017 | Vangala et al. | G06Q 30/0224 |
| 2017/0277691 A1* | 9/2017 | Agarwal | H04L 67/22 |
| 2018/0084310 A1* | 3/2018 | Katz | H04H 60/66 |
| 2018/0240147 A1 | 8/2018 | Stevens et al. | G06Q 30/0244 |

OTHER PUBLICATIONS

J. Salamon and J. P. Bello, "Deep Convolutional Neural Networks and Data Augmentation for Environmental Sound Classification," Mar. 2017, IEEE Signal Processing Letters, vol. 24, No. 3, pp. 279-283 (Year: 2017).*
K. He, X. Zhang, S. Ren and J. Sun, "Deep Residual Learning for Image Recognition," IEEE Conference on Computer Vision and Pattern Recognition (CVPR), pp. 770-778 (Year: 2016).*
Arash Asef Nejad, Karim Faez, "A Novel Method for Extracting and Recognizing Logos," Oct. 2012, International Journal of Electrical and Computer Engineering, vol. 2, No. 5, pp. 577-588 (Year: 2012).*
Karen Simonyan, Andrew Zisserman, "Very Deep Convolutional Networks for Large-Scale Image Recognition", Apr. 2015, Visual Geometry Group, Department of Engineering Science, University of Oxford (Year: 2015).*
International Search Report and Written Opinion issued in application No. PCT/US20/039000, dated Aug. 28, 2020 (15 pgs).
International Preliminary Report on Patentability issued in application No. PCT/US19/026813, dated Oct. 13, 2020 (8 pgs).
Beres, A. "Sentiment Analysis Framework Organization Based on Twitter Corpus Data", Scientific Bulletin of the "Petru Maior", University of Targu Mures, vol. 9, No. 1, 2012, pp. 22-25.
Notice of Allowance issued in U.S. Appl. No. 16/582,948, dated Oct. 22, 2021, 24 pgs.
Notice of Allowance issued in U.S. Appl. No. 16/710,971, dated Feb. 3, 2022, 37 pgs.
U.S. Appl. No. 16/582,948, filed Sep. 25, 2019, Tilton et al.
U.S. Appl. No. 16/710,971, filed Dec. 11, 2019, Kraus et al.
Office Action issued in U.S. Appl. No. 16/582,948 dated Jun. 24, 2021, 37 pgs.
Office Action issued in U.S. Appl. No. 16/710,971, dated Sep. 14, 2021, 33 pgs.
International Preliminary Report on Patentability issued in PCT/US19/64737 dated Jun. 16, 2021, 8 pgs.
U.S. Appl. No. 14/702,839, filed May 4, 2015.
Knott et al., "An alternate approach to developing a total celebrity endorser rating model using the analytic hierarchy process." International Transactions in Operational Research, vol. 11, No. 1, Jan. 2004, pp. 87-95 (Year: 2004) (9 pgs).
Office Action issued in U.S. Appl. No. 14/702,839, dated Apr. 20, 2018 (15 pgs).
Office Action issued in U.S. Appl. No. 14/702,839, dated Aug. 28, 2018 (13 pgs).
Office Action issued in U.S. Appl. No. 14/702,839, dated Aug. 25, 2017 (7 pgs).
Office Action issued in U.S. Appl. No. 14/702,839, dated Dec. 26, 2017 (10 pgs).
Office Action issued in U.S. Appl. No. 14/702,839, dated Mar. 25, 2019 (13 pgs).
Pikas et al., "Assessing the Qualities of Athlete Endorsers: A Study of Consumer Preferences for the 3 Qualities of Sports Endorsers." Journal of Marketing Development and Competitiveness, vol. 6, No. 3, Aug. 2012, pp. 42-55 (Year: 2012) (15 pgs).
U.S. Appl. No. 16/582,948, filed Sep. 25, 2019.
International Search Report and Written Opinion issued in application No. PCT/US19/26813, dated Aug. 7, 2019 (12 pgs).
International Search Report and Written Opinion issued in application No. PCT/US19/65737, dated Feb. 25, 2020 (11 pgs).

* cited by examiner

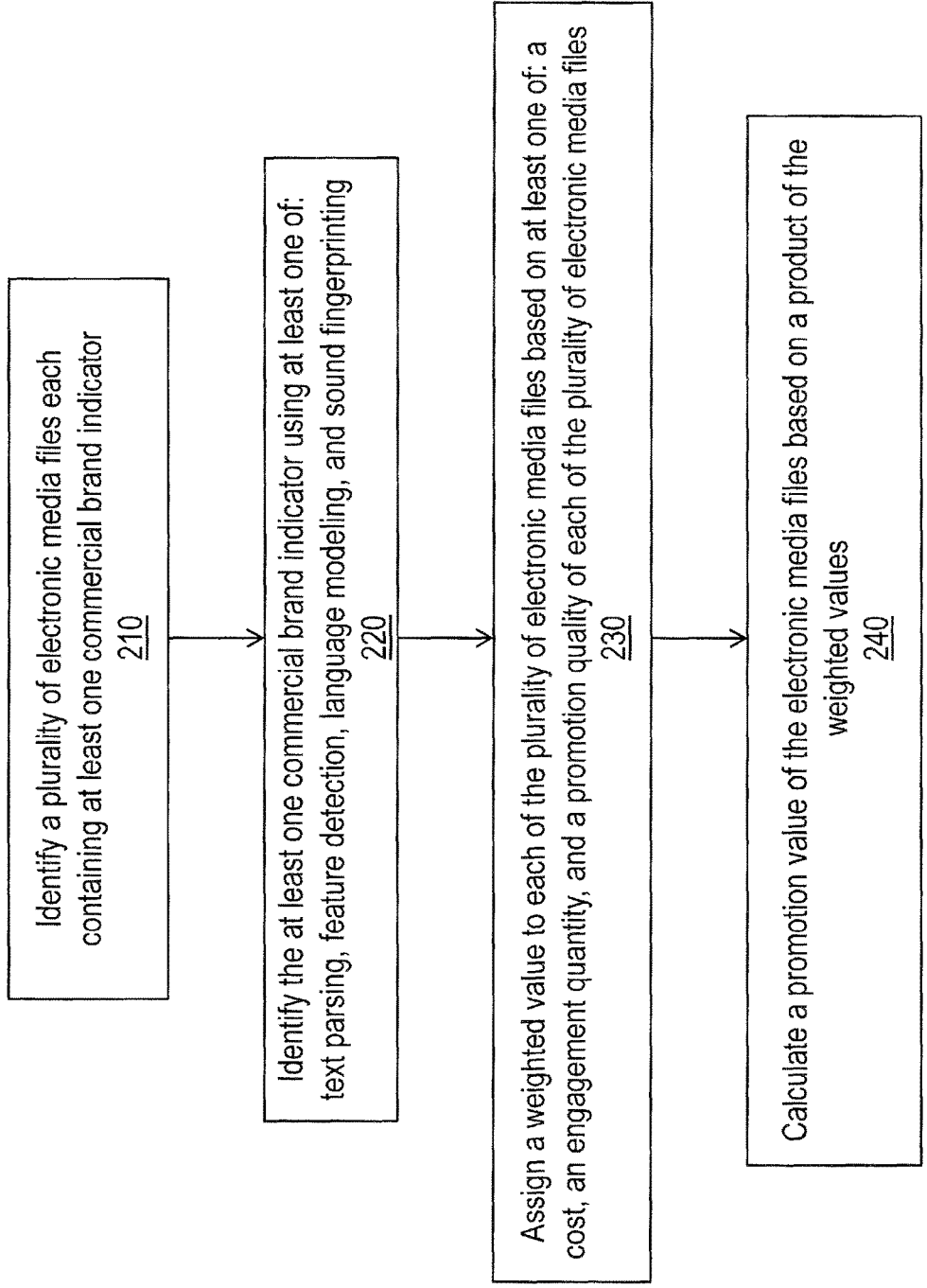

DEEP NEURAL NETWORKS MODELING

CROSS REFERENCE TO RELATED APPLICATION

This application claims the benefit of U.S. Provisional Application Ser. No. 62/655,676 filed Apr. 10, 2018 and titled "Modeling Promotion Value with Deep Neural Networks," the entire disclosure of which is incorporated herein by reference.

FIELD OF THE DISCLOSURE

The present disclosure is generally related to modeling the promotional value of commercial brands and properties, and more particularly is related to using deep neural networks to detect commercial brand indicators in electronic media and report their promotional value.

BACKGROUND OF THE DISCLOSURE

In the field of sports, commercial brands often enter into promotional relationships with athletes, teams, leagues, and events designed to drive exposure, revenue, and market share of the brands. Athletic apparel companies may provide shoes, uniforms, or other equipment to teams in consideration for the exposure these companies will receive when the teams play using their products. Equipment manufacturers create branded or endorsed product lines supported by famous athletes. Other entities may sponsor an entire game, series, or large athletic event, marking various aspects of the event with their desired branding.

A problem common to marketing efforts is the difficulty of measuring the value that promotional relationships create for a brand. Analysis of sales and revenue may only tell part of the story, and may not accurately account for the costs involved in maintaining the relationships. Moreover, with the prevalence of digital and social media, athletic companies may not be aware of the best pathways for valuing their promotions. Social media campaigns, Twitter® hashtags, and audio/visual posts that include logos and other branding may create significant exposure and brand recognition. It is also difficult to measure one promotional relationship against another, or one brand against another, as there is no standardized way to benchmark promotion values.

Another problem is that promotion value measurements may not provide enough detail or dimension for brands wanting to improve their promotional value. It is difficult to know precisely what aspect of a promotion is driving the value. For example, for a logo displayed onscreen during a televised event, how do the logo size, clarity, placement, display time, color, or other factors affect the promotion value? Furthermore, what change or changes to these factors will improve the promotion value? Further still, what is the relationship between the factors, and how will changing any one factor affect others?

Thus, a heretofore unaddressed need exists in the industry to address the aforementioned deficiencies and inadequacies.

SUMMARY OF THE DISCLOSURE

Embodiments of the present disclosure provide computer-implemented methods of modeling the promotion value of a commercial brand. In this regard, one embodiment of such a method, among others, can be broadly summarized by the following steps: identifying a plurality of electronic media files each containing at least one commercial brand indicator; determining at least one context for each of the at least one commercial brand indicators; mapping each brand indicator context to a feature vector; mapping each feature vector to an input layer of a neural network; mapping the input layer to a plurality of hidden layers of the neural network; generating a promotion value model by learning weights for each of a plurality of transitions between the layers of the neural network, such that the learned weights indicate a relative value between the layers, wherein the promotion value model is configured to determine a promotion value of a commercial brand; and reporting the determined promotion value.

The present disclosure can also be viewed as providing a computer-implemented process for determining a promotion value of electronic media files. In this regard, one embodiment of such a method, among others, can be broadly summarized by the following steps: identifying a plurality of electronic media files each containing at least one commercial brand indicator; identifying the at least one commercial brand indicator using at least one of: text parsing, feature detection, language modeling, and sound fingerprinting; assigning a weighted value to each of the plurality of electronic media files based on at least one of: a cost, an engagement quantity, and a promotion quality of each of the plurality of electronic media files; and calculating a promotion value of the electronic media files based on a product of the weighted values.

The present disclosure can also be viewed as providing a system and method for determining a promotion quality of a logo in visual media. Briefly described, in architecture, one embodiment of the system, among others, can be implemented as follows. The system includes a remote computer device. At least one visual media file is electronically accessible over at least one network system by the remote computer device. A logo recognition application is hosted at least partially on the remote computer device. The logo recognition application includes a neural network trained to detect and identify a logo in a visual media file, wherein the application detects a logo within the at least one visual media file, identifies the logo, determines a promotion quality of the logo by applying weighted values to at least one of: a size, a location, a visibility, and an exposure duration of the logo, and reports the promotion quality of the logo.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a flow chart illustrating a computer-implemented process for determining a promotion value of electronic media files, in accordance with a second exemplary embodiment of the present disclosure.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many aspects of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

Some aspects of the invention may also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks. Data structures and transmissions of data particular to aspects of the invention are also encompassed within the scope of the invention.

Figure 1A:
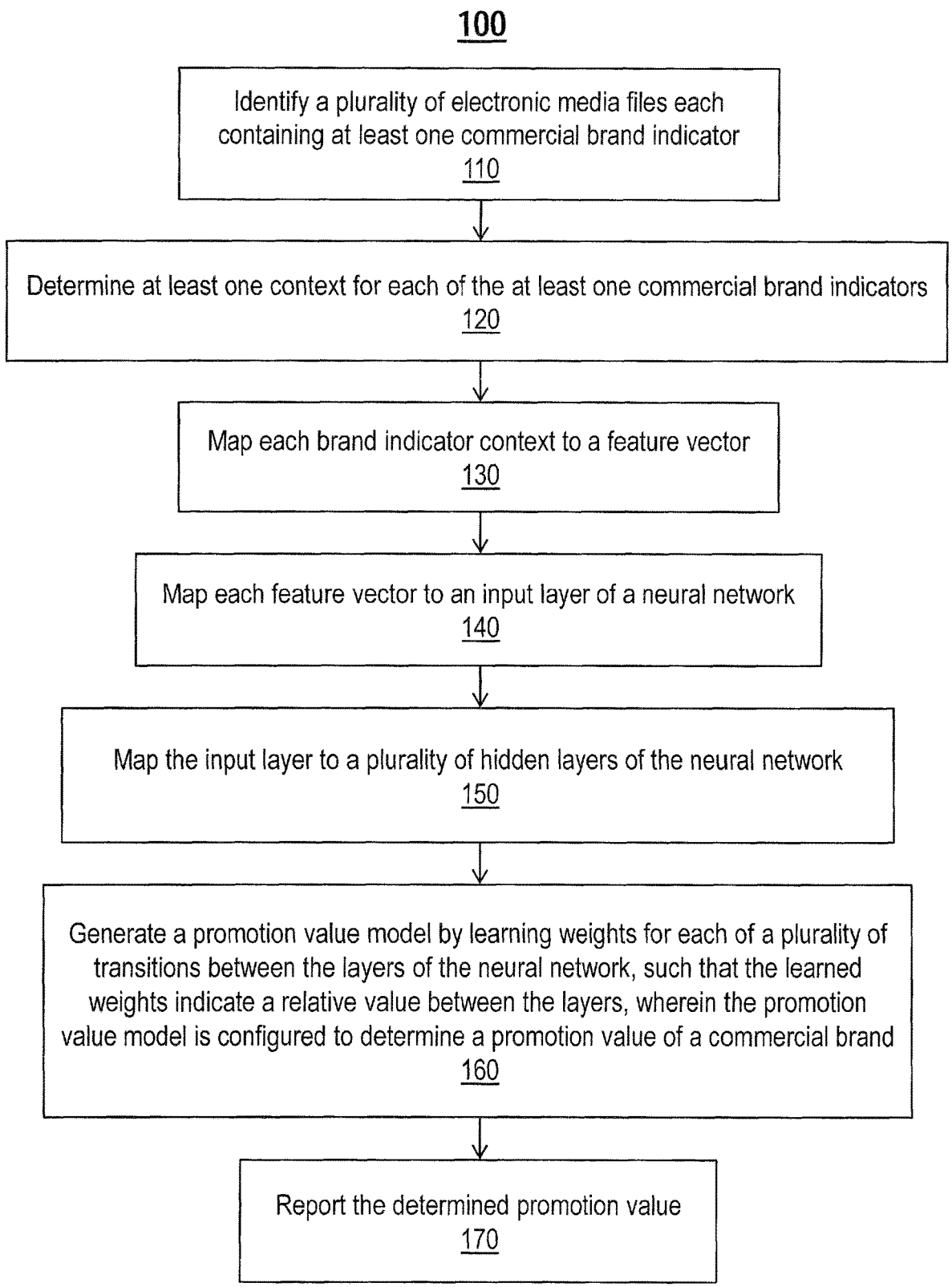
FIG. 1A is a flow chart showing a computer-implemented process for determining a promotion value of a brand, in accordance with a first exemplary embodiment of the present disclosure.

FIG. 1A is a flow chart 100 showing a computer-implemented process for determining a promotion value of a brand. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

The process includes: identifying a plurality of electronic media files each containing at least one commercial brand indicator 110; determining at least one context for each of the at least one commercial brand indicators 120; mapping each brand indicator context to a feature vector 130; mapping each feature vector to an input layer of a neural network 140; mapping the input layer to a plurality of hidden layers of the neural network 150; generating a promotion value model by learning weights for each of a plurality of transitions between the layers of the neural network, such that the learned weights indicate a relative value between the layers, wherein the promotion value model is configured to determine a promotion value of a commercial brand 160; and reporting the determined promotion value 170.

Step 110 includes identifying a plurality of electronic media files each containing at least one commercial brand indicator. Electronic media files may be any digital media, including visual, audio, text, and the like. In one example, visual media may include photos, images, videos, television programs, websites, digital artwork, and the like. Audio media may include music, podcasts, radio broadcasts, audio components of videos, voice recordings, phone calls, talk shows, sound clips, and the like. Text media may include websites, news articles, social media entries, headlines, search results, hashtags, and the like. Posts from social media apps and websites may fall into one or more of these categories. For instance, one user may share a video containing a brand indicator on his Facebook® news feed, and other users may respond to that video with text comments, hashtags, pictures, or additional video. Such a post may be considered a single electronic media file or many, depending on the implementation of the method.

A commercial brand indicator may be any image, logo, object, product, sound, text, character, or series of actions used to identify or promote a commercial brand or property. For example, many brands are represented by logos and other visual trademarks. Some properties can be identified by particular sounds or theme songs. Text identifying a brand in a news article or social media post—including product or brand names, trademarks, hashtags, and other tags—may indicate a commercial brand. Even a series of actions, such as a touchdown dance or hand gesture, may denote an athlete's brand or a promotional campaign. For the purposes of this disclosure, a commercial brand may be any brand name, property, event, venue, personal or professional likeness, or any other source or origin of commercial activity. A commercial brand indicator may be any symbol, action, sound, or image that designates a commercial brand.

Electronic media files may contain one or more commercial brand indicators in a number of ways. Visual media files may depict logos, team jerseys, distinctive products, event branding, and the like. For example, a social media user may post a picture of a basketball player wearing a jersey sponsored by an athletic apparel company. Or a television broadcast of a football game may incidentally show a banner advertisement near the field while broadcasting the game. A Twitter® post may contain text describing a sporting event and culminating in a promotional hashtag. Media files may contain multiple indicators for the same brand, or single indicators for multiple brands. The commercial brand indicator may not be the subject or main focus of the electronic media files. For instance, photographs containing a team logo in the midground or background may nonetheless provide some amount of promotion value as determined by the process.

The electronic media files may be identified using a computer connected to at least one network system. The computer may be any computer, computer network, or server capable of analyzing electronic media files. The network system may be any network capable of connecting the computer to access the electronic media files, including wired Internet connections, cellular networks, Wi-Fi®, Bluetooth®, satellite, and the like. The network system may provide access to the Internet, intranets, electronic media file databases, and the like.

In one example, a computer server may use a wired connection to the Internet to crawl social media sites, news outlets, and other sources of electronic media files. The server may search for electronic media files on social media posts, news articles, and the like, and may identify relevant files for further processing. Searching may be either targeted or aggregation searching. In targeted searching, the computer server may use the source of electronic media files to search based on specific criteria, such as by account name, hashtag, mention, embedded mention, logo, relevant event, or keyword. Targeted searching may also include date ranges, popular or trending posts, or searching based on geographic location. Aggregation searching may include reading through all available data as time and resources permit. In one example, the server may download relevant files to computer-readable memory to be stored for further processing. In another example, the server may process relevant files in working memory without storing the files long-term, extracting the necessary data and discarding any extraneous information.

The computer may determine that the electronic media files contain commercial brand indicators by using machine learning, computer vision, and audio processing techniques to search portions of the image looking for evidence of the commercial brand indicators. For files containing text, the computer may utilize text analysis and parsing techniques to search for keywords such as names, places, and dates. For files containing visual data, the computer may utilize computer vision techniques to identify logos and other visual elements located within the file. For files containing audio, the computer may utilize sound fingerprinting and language processing techniques to identify sounds or spoken words indicating a commercial brand. These techniques are discussed in greater depth in FIG. 2, below.

Step 120 includes determining at least one context for each of the at least one commercial brand indicators. A context is a numeric value based on the characteristics of the media file or the commercial brand indicator. For example, one context may be dependent on the type of electronic media file, and different values may be assigned to visual files, audio files, text files, or combinations of files. Another context may be dependent on the popularity of the file, and may be different based on whether the file is trending, stagnant, popular, controversial, and the like. Another context may be dependent on whether the file contains promotion tags, such as hyperlinks, keywords, @mentions, hashtags, advertisements, and the like.

Some contexts may be dependent upon the inherent qualities of the brand indicator itself. For example, a visual brand indicator such as a logo may have a number of inherent qualities within an image, such as placement, prominence, size, color, contrast, orientation, visibility, and the like. A visual brand indicator within a video may have additional qualities, such as exposure duration, exposure location, and the like. A textual brand indicator may have a number of inherent qualities within a post or article, such as location, length of text, inclusion with other indicators, number of mentions, and the like. An audio brand indicator may have a number of inherent qualities as well, such as clarity, volume, broadcast length, background noise, and the like.

In one example, these qualities may be organized by groups. Group values may be ordered as single data points, ordered pairs, vectors, or matrices.

For example, a size group may include the absolute and relative sizes of the commercial brand indicator in relation to the electronic media file. For visual media, such as images and videos, this may include the absolute and relative sizes of logos, banners, color schemes, uniforms, and the like. Relative sizes may be compared to other brand indicators, people, or limits of resolution. For text media, this may include the absolute and relative length of words or phrases in relation to the entirety of the text. For audio media, this may include the absolute and relative length of words and sounds in relation to the entirety of the audio file. Values may be assigned to the absolute and relative size qualities as a matrix or ordered pair.

A location group may include the absolute and relative location of the commercial brand indicators. For visual media, this may include the absolute and relative locations of logos and the like within the frame of the visual media. For example, a logo located in a visually appealing portion of an image, for instance, along a line using the photography "rule of thirds", may receive a higher value than a logo in the corner of the image. As another example, a logo located outside of a visually appealing region, but located relative to other elements of the image such that it stands out or attracts a viewer's eye may receive a higher value. For text media, this may include the absolute and relative location of words and the like within the text. For example, text near the beginning of an article or post may be more likely to be read, and may receive a higher value. As another example, text later in a post, but positioned to be distinct from other text, may also receive a higher value. For audio media, this may include the absolute and relative location of the words or sounds relative to the entirety of the audio file. For example, audio near the beginning of a clip or show may be more likely to be heard, and may receive a higher value. As another example, audio located during a popular segment of a show relative to other portions may also receive a higher value.

A visibility group may include characteristics such as clarity, contrast, obstructions, and noise or competition. For visual media, this may include these characteristics as they pertain to the logos, symbols, uniforms, color schemes, and the like. Clarity may include the resolution or image quality of the visual brand indicator. Contrast may include the visual difference between the visual brand indicator and surrounding portions of the file. Obstructions may include a value based on whether any portion of the brand indicator is hidden or otherwise not visible. Noise or competition may include a value based on whether there are other brand indicators competing for a viewer's focus and attention. For text media, this may include these characteristics as they pertain to words, phrases, and hashtags. For example, this may include values based on whether the text is easy to read, whether the text stands out from other text, whether the text is spelled correctly, or whether there is other brand indicator text competing for a viewer's focus and attention. For audio media, this may include these characteristics as they pertain to words and sounds. For example, this may include values based on whether the audio is high quality, whether it can be distinguished from other audio, whether there is background noise or other distractions, or whether the full audio brand indicator is heard.

An exposure group may include values based on whether the commercial brand indicator's presence is subject to diminishing returns. For example, the same image, commercial, or hashtag posted numerous times may eventually attract diminishing attention, and therefore have lower value. Exposure may also include values based on whether the commercial brand indicator represents an endorsement of the brand. Endorsements, whether from individuals, celebrities, coaches, institutions, or associated groups, may indicate a higher promotion value than other types of mentions.

A cost group may include values related to the cost of the electronic media file. For instance, sponsored posts or content created on behalf of a brand may have a fixed cost, or a cost per view. Posts made spontaneously by others may include commercial brand indicators, such as banners, tents, uniforms, and the like, that have a cost to manufacture.

Other characteristics may be included in these groups, and other groups may be analyzed. Furthermore, characteristics may be grouped differently, depending on implementation.

Step 130 includes mapping each brand indicator context to a feature vector. The data sets created by the brand indicator context values may be mapped to n-dimensional numerical values representing each brand indicator. For example, a logo may be given data sets based on file type, size, location, visibility, and exposure, each data set corresponding to the values of the characteristics within each of the groups. The data sets may be organized as feature vectors. For instance, for a logo with a location context including the absolute and relative locations of the logo in an image, the values for the data set may be $L_{Abs}$ and $L_{Rel}$, respectively. These values would be mapped to the feature vector:

$$\begin{bmatrix} L_{Abs} \\ L_{Rel} \end{bmatrix}$$

For data sets comprising more feature data, the feature vector may have additional dimensions.

Step 140 includes mapping each feature vector to an input layer of a neural network. The input layer provides the initial data set for the neural network to process. The input layer may include one or more input neurons, each neuron comprising the data mapped from each of the feature vectors. This is discussed in greater detail in FIG. 1B, below.

Step 150 includes mapping the input layer to a plurality of hidden layers of the neural network. Data from each neuron of the input layer may be passed to each neuron of the first hidden layer, which may perform a nonlinear activation function based on the input received. Each input data may be multiplied by a weight calculated by the neural network to give an accurate result. This process is discussed in greater detail in FIG. 1B, below.

Step 160 includes generating a promotion value model by learning weights for each of a plurality of transitions between the layers of the neural network, such that the learned weights indicate a relative value between the layers, wherein the promotion value model is configured to determine a promotion value of a commercial brand. As the values from the input layer are fed to the neurons of the first hidden layer, each value may be multiplied by a weight indicating the relative value the input provides in determining the output of each hidden layer neuron. Some input neurons may be weighted more heavily in order to more greatly influence the hidden layer neuron output. Outputs may be calculated for each of the first hidden layer neurons, and each of those outputs fed to neurons in a next hidden layer. Each output may be weighted to indicate the relative value that neuron provides in determining the output of the next hidden layer neuron. This may continue for each transition between layers, through a final transition to the output layer. The output layer may indicate a promotion value for the brand, campaign, or property. In one example, the promotion value may be monetary; i.e., the monetary worth of the promotional efforts. In another example, the promotion value may indicate the time worth, effort worth, market share worth, public relations worth, or other types of value.

The neural network may act as a model to determine promotional values for brands, campaigns, electronic media files, and the like. The model may be trained using data sets from electronic media files containing commercial brand indicators. The training data sets may have known promotion values. When the training data sets are fed to the neural network, the data may be fed from input layer to hidden layer, hidden layer to hidden layer, hidden layer to output layer, and so on. The inputs for each neuron may be multiplied by weights as described above. Initially, each of these weights may be randomly assigned. As the model runs a training data set, it may apply the randomly-assigned weights, finally arriving at a promotion value determination. The determined promotion value may be compared to the known promotion value for the data set. If the determined and compared promotion values are not within an acceptable margin of tolerance, the model may be adjusted. Using common training methods, such as back-propagation algorithms, the neural network may adjust the randomly-assigned weights to achieve a more accurate result. Using multiple training data sets, the neural network may make multiple incremental adjustments to any of the transition weights between layers. After sufficient training and adjustment, the neural network may be able to accurately determine the promotion value of every one of the training data sets. The model may now be able to accurately determine the promotion value of real-world electronic media files, as the training process has taught the model the appropriate weight values to apply to each neuron's input.

In one example, the promotion value determined by the model may be further processed. For example, the input layer may comprise only data relating to the quality of the commercial brand indicator, and the output may be considered a "raw" promotion value. The raw promotion value may be further processed by multiplying values such as cost factors, the file type, views or level of engagement, and the like. This may result in a final promotion value.

Step 170 includes reporting the determined promotion value. Once the promotion value has been determined to within an acceptable margin of accuracy, it may be reported to interested parties, such as analysts, brand owners, executives, and the like. In one example, the promotion value may be reported through a web interface, such as a website with a user dashboard and graphical user interface. Users may log on to the website and view, request, or track promotion values. For instance, for previously-run calculations, a user may navigate to a page on the website and select promotion values to display or compare. For new calculations, a user may navigate to a different page, enter or upload the relevant information into the model, and request a promotion value determination. For tracking, a user may request that certain terms, hashtags, logos, labels, media posts, or other commercial brand indicators be tracked over a period of time. The model may make promotion value determinations periodically, for instance hourly, daily, or weekly, and may track the promotion value as it changes over time. The model may also track changes in promotion value across different electronic media platforms, geographic locations, age and other demographic factors, types of commercial brand indicators, and the like. The tracked data may be processed to identify trends, predict future values, or suggest ways to bolster a brand's presence.

In one example, the model may be used in reverse to determine which qualities an electronic media file must have in order to achieve a particular promotion value. For instance, the model may determine that a Twitter® post valued at a particular dollar amount must receive a certain amount of exposure, or contain fewer than a certain number of words, or be posted at a particular time of day. The model may determine a number of scenarios in which an electronic media file may achieve a desired promotion value or range of promotion values. The platform may report this to users, along with the other data discussed above.

Any other suitable reporting methods are also contemplated within the scope of this disclosure. For instance, promotion value and other information may be reported electronically via software applications, programs, e-mails, notifications, text messages, media posts, and the like. The information may be reported in the form of printed reports, digital files on storage media, and the like. The information may also be reported via telephone, voicemail, and the like.

Figure 1B:
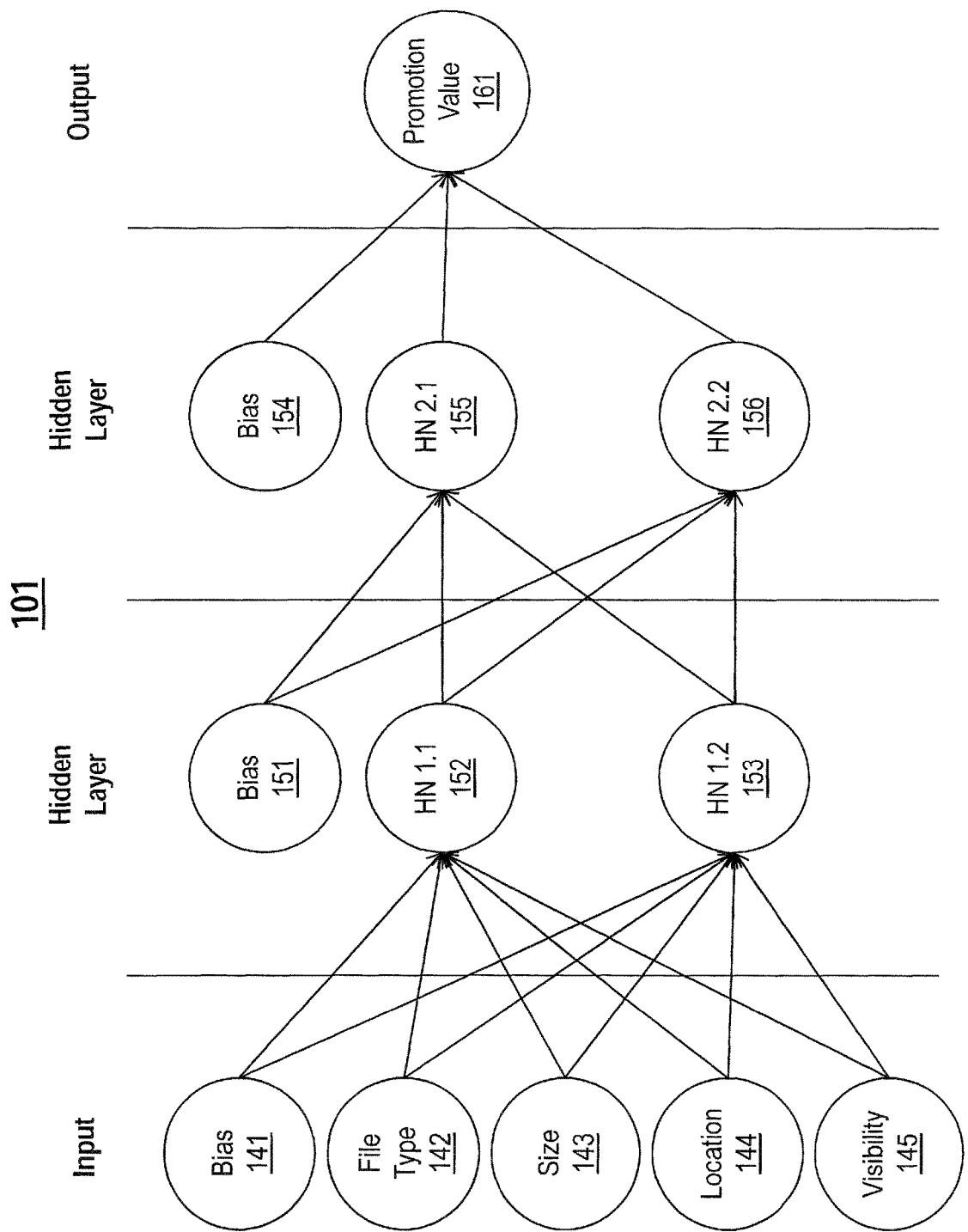
FIG. 1B shows an exemplary neural network built using the process of FIG. 1A, in accordance with the first exemplary embodiment of the present disclosure.

FIG. 1B shows an exemplary neural network 101 built using the process of FIG. 1A. It should be noted that the neural network 101 is intended only to be exemplary in nature, and it may not show or demonstrate all of the contemplated aspects of a functioning neural network as set forth in this disclosure. In implementation, the neural network of the present disclosure may include more or fewer input neurons, more or fewer hidden layers having more or fewer hidden neurons, or more outputs. FIG. 1B shows a neural network 101 having an input layer, two hidden layers, and an output layer. The input layer includes input neurons 142, 143, 144, and 145 corresponding to some of the commercial brand indicator contexts discussed in FIG. 1A. As shown in FIG. 1B, these input neurons include file type, size, location, and visibility contexts. The input neurons 142, 143, 144, and 145 may correspond to single values or n-dimensional vectors, as discussed above. In one example, a bias neuron 141 is also commonly included in the input layer.

Prior to determining the input neurons 141-145, data may be processed and analyzed to achieve an appropriate input value. In one example, analysis may include consideration of one or more of the sourced costs per engagement, predictions of video retention graphs, e.g., viewership over time of a video, predictions of impressions or video view data, content competition analysis, promotional indicators, sentiment analysis, and promotional quality ecosystem analysis. Predictions of video retention graphs may be used when the same data is unavailable from the electronic media platform. Predictions of impressions or video view data may be used the same data is unavailable from the electronic media platform. Content competition analysis may include an assessment of the value against all of the commercial brand indicators being tracked within the ecosystem. Promotional indicators may include analysis of a commercial brand's social posts and specific hashtags or keywords being used in promotional campaigns. Sentiment analysis may include the promotion or engagement on the promoted content to determine whether the response has been positive or negative. And promotional quality ecosystem analysis may include a quality analysis across the entire ecosystem to determine the upper and lower bounds of the value and grade accordingly. Each of the neurons 141-145 in the input layer is multiplied by a weighted value and mapped into a function in the hidden layer. A first hidden layer neuron 152, 153 performs the function and sums the values into an output. The function may be any of the nonlinear functions commonly used in neural network processing, such as sigmoid, tanh, rectified linear unit, and the like. The number of neurons in the first hidden layer may be determined to minimize overfitting and to maximize processing capability. A bias neuron 151 may also be present in the first hidden layer. The outputs of each of the first hidden layer neurons 152, 153 are mapped as the inputs of the next hidden layer neurons 155, 156, and are multiplied by additional weighted values before being processed by the functions of the next hidden layer. The next hidden layer may also comprise a bias neuron 154. The neural network 101 may include any number of hidden layers necessary to determine the promotion value 161, and may particularly include the optimal number of hidden layers necessary to determine the promotion value 161 to within a desired degree of certainty.

The outputs of the final hidden layer neurons are multiplied by additional weighted values and summed to determine a promotion value 161 for the electronic media file. The promotion value 161 is in the output layer of the neural network 101, and may comprise a single numerical value, n-dimensional matrix, or multiple output neurons. The promotion value 161 may also be fed by a bias neuron 154 in the previous hidden layer.

The neural network 101 may be trained using common neural network training methods as discussed relative to FIG. 1A, above. After sufficient training and adjustment, the neural network 101 may be able to accurately determine the promotion value of new commercial brand indicators in a variety of electronic media files.

The neural network 101 may be updated or refined from time to time to ensure it maintains accuracy. Incorrect or suspicious answers may receive troubleshooting and correction. Further, all training data may be subject to at least one quality check before being used to train the neural network 101.

FIG. 2 is a flowchart 200 illustrating a computer-implemented process for determining a promotion value of electronic media files. The process includes the following steps: identifying a plurality of electronic media files each containing at least one commercial brand indicator 210; identifying the at least one commercial brand indicator using at least one of: text parsing, feature detection, language modeling, and sound fingerprinting 220; assigning a weighted value to each of the plurality of electronic media files based on at least one of: a cost, an engagement quantity, and a promotion quality of each of the plurality of electronic media files 230; and calculating a promotion value of the electronic media files based on a product of the weighted values 240.

Step 210 includes identifying a plurality of electronic media files each containing at least one commercial brand indicator. The electronic media files and commercial brand indicators may be any number and type as described relative to FIG. 1A, above. The electronic media files may be identified manually or using software that crawls the media platforms searching for content. The electronic media files may be identified using a computer connected to at least one network system. The computer may be any computer, computer network, or server capable of analyzing electronic media files. The network system may be any network capable of connecting the computer to access the electronic media files, including wired. Internet connections, cellular networks, Wi-Fi®, Bluetooth®, satellite, and the like. The network system may provide access to the Internet, intranets, electronic media file databases, and the like.

Step 220 includes identifying the at least one commercial brand indicator using at least one of: text parsing, feature detection, language modeling, and sound fingerprinting. The applied methods of identifying the commercial brand indicator may be determined based on the nature of the electronic media file.

For electronic media files containing text, such as social media posts, blogs, news articles, and the like, text parsing may be used to identify the at least one commercial brand indicator within. A computer may initially be used to identify key words or phrases in text through a simple keyword search. However, text parsing may also be performed in order to simplify complex language into computer-understandable language. Text parsing may help to identify misspelled terms, determine a context in which the terms are used, and split text posts into sections for further analysis. For instance, to determine a context in which a commercial brand indicator is used, the computer may parse the adjacent text looking for words or structure indicating positive or negative use, emotions, or intent. As another example, to determine the relative location of the commercial brand indicator in the electronic media file, the computer may parse the entire file, looking for natural breaks, important points, or areas where a viewer's interest might fall off Parsing may allow the computer to determine any of the qualities discussed relative to FIG. 1A, including size, location, visibility, and exposure, among others.

For electronic media files containing visual features, such as images, photographs, drawings, and video, feature detection may be used to identify the at least one commercial brand indicator within. Feature detection may be performed with any suitable computer vision techniques used to identify subject matter in electronic images. The feature detection techniques may attempt to identify portions of the visual media as having features associated with commercial brand indicators. For example, the feature detection may attempt to identify the outline of a known logo in order to determine the source of the logo. In another example, the feature detection may attempt to identify a color scheme within the electronic media file as the source of a commercial brand. For instance, many sports teams adopt color schemes to represent their organizations, and they frequently brand uniforms, merchandise, and the like with these colors. A neural network may be used to detect features and determine contexts for the commercial brand indicators. The neural network may be any type of neural network, including a deep neural network, convolutional neural network, a feedforward neural network, and the like. The input layer of the neural network may comprise feature vectors representing the image data. The neural network may be programmed for edge detection, contrast comparison, pattern recognition, and other computer vision techniques.

In one example, the neural network may perform as follows:

For electronic media files containing audio features, such as video posts, sound clips, songs, and podcasts, language modeling and sound fingerprinting may be used to identify the at least one commercial brand indicator within. Language modeling includes analyzing spoken words to determine content, context, and meaning. Language modeling may involve common analysis techniques such as determining word frequency, collocation, concordance, N-grams, entity recognition, dictionary tagging, and the like. In one example, the computer may look for portions of language that match key words, such as brand names, player names, team names, event names, and the like. The computer may then search the adjacent areas for language indicating positive or negative associations or additional context. Sound fingerprinting includes creating a unique digital identifier for a sound based on audio characteristics such as frequency, amplitude, relative intensity, and the like. The sound fingerprint may be created for any sound acting as a commercial brand indicator, for instance, sound effects, catchphrases, and songs. When audio media files are identified, the audio may be compared with the sound fingerprint to determine whether there is a match, and therefore whether the commercial brand indicator is present in the file. In one example, the computer may attempt to identify portions of the audio file that match the sound fingerprint. After finding a match, the computer may use language parsing or other processing techniques to determine a context and other details.

Step 230 includes assigning a weighted value to each of the plurality of electronic media files based on at least one of: a cost, an engagement quantity, and a promotion quality of each of the plurality of electronic media files. One or more characteristics of the electronic media files may be converted to a numerical value and multiplied by a weighting factor. The resultant product may be a weighted value representing the characteristics' relative contribution to a final determination of promotion value. In one example, these characteristics may be cost engagement quantity, and promotion quality of the plurality of electronic media files. However, more or fewer characteristics may be assigned weighted values, depending on implementation of the method.

A cost characteristic may include the costs associated with creating the electronic media file, the cost per engagement, the cost to create the brand indicator referenced in the file, or some combination thereof. The cost to create the electronic media file may include the cost to place an advertisement, the cost to pay personnel to make a post, and the like. The cost per engagement may include the overall costs broken down based on total viewer or user engagement. The cost to create the brand indicator may include printing or manufacturing costs where a physical brand indicator is shown in a picture or video, royalties or licensing costs where the brand indicator is in audio, and so on. The cost characteristic may include other indicators of cost where appropriate. If multiple cost factors are considered, the cost factors may be added together to determine a single cost characteristic. In one example, the cost factors may be multiplied by weighting factors before being summed. In another example, the cost characteristic may be a weighted matrix, each value in the matrix representing a cost factor.

An engagement quantity characteristic may include the number of users the electronic media file has reached or the number of users who have engaged with the media file in a deeper way. The number of users reached may include simple page views or listens. The number of users who have engaged may include instances of commenting, sharing/reposting, liking or giving other impressions, or other indirect responses to the media file. For example, the engagement quantity value for a Twitter® post may be higher based on the number of retweets the post receives, while the quantity for a Facebook® post may depend upon the number of likes or shares. In some cases, negative engagement, or engagement that creates a negative image for the brand, may be given low or negative values. The engagement quantity characteristics may include other indicators of engagement quantity where appropriate. If multiple factors are considered, the engagement quantity factors may be added together to determine a single engagement quantity characteristic. In one example, the engagement quantity factors may be multiplied by weighting factors before being summed. In another example, the engagement quantity characteristic may be a weighted matrix, each value in the matrix representing an engagement quantity factor.

A promotion quality characteristic may be any of the quality contexts discussed relative to step 120 in FIG. 1A, above. These characteristics pertain to the commercial brand indicator itself. For example, these characteristics may include the size, location, visibility, and exposure of the commercial brand indicators located within the electronic media files. Each of these characteristics may include numerous features as discussed relative to FIG. 1A. For instance, features of the size characteristic may include relative and absolute size; features of the location characteristic may include relative and absolute location; features of the visibility characteristic may include clarity, contrast, obstructions, noise, or competition; features of the exposure characteristic may include diminishing returns and other exposure qualities. Each of the promotion quality characteristics may be summed to a single value or may be expressed as a matrix of values. Some or all of the features may receive weighting factors before being summed.

Promotion quality may also include characteristics such as competition, clutter, placement, and audience. Competition may include coverage of the brand being valued in comparison to any other brands also appearing or otherwise included in the content. Clutter may include the number of brand promotions in comparison to all other features that may reduce the visibility or the noticeability of the brand promotion. For instance, regarding text, one small amount of text located in proximity to several pieces of text may be difficult to notice, as it may not be very apparent to a viewer. Placement may include the location of the brand indicator within the physical environment depicted in the electronic media file. For instance, a logo placed on a soccer jersey may yield a lower placement score than a logo on a billboard in a stadium due to the exposure and visibility of the billboard. Multiple brand indicators with multiple placement vectors, e.g. Audi® sponsoring an event title and being featured on a billboard, may receive separate and summable placement values. Audience may include a consideration of the audience viewing or otherwise engaging with the brand indicator.

Where single electronic media files contain multiple commercial brand indicators, the cost, engagement quantity, and promotion quality weighted values may be determined as a sum of each brand indicator's characteristics. For example, in a Twitter® post containing a photograph of a commercial brand indicator and a related hashtag, the cost characteristic may be the total cost for both the photograph and the hashtag, the engagement quantity characteristic may be the total engagement quantity for both the photograph and the hashtag, and the promotion quality may be the total promotion quality for both the photograph and the hashtag. In one example, these totals may be normalized or capped at maxima and minima. In another example, the weighted characteristics may be expressed as vectors or matrices instead of being summed.

The weights assigned to each of the characteristics may be determined by a person or by the computer. Weights may be calculated using common rules or values in marketing. In another example, the weights may be calculated using analytical models to find optimal relationships between the characteristics considered. The weights used may depend on the type and number of characteristics considered. In one example, the weights may be different depending on the type of electronic media file.

As an example of step 230, two electronic media files may be considered—a Facebook® post with a picture of an athlete wearing a sponsored uniform, and a Twitter® post with a hashtag referencing the sponsor company. The Facebook® post may be assigned weighted values based on the cost characteristic, the engagement quantity characteristic, and the promotion quality characteristics of the post. Then, the Twitter® post may be assigned weighted values based on the cost characteristic, the engagement quantity characteristic, and the promotion quality characteristics of the Twitter® post. The weighted values for each post's cost may be summed, directly or by first applying weights. The weighted values for each post's engagement quantity and promotion quality, respectively, may be summed in the same way. This may result in one weighted cost, one weighted engagement quantity, and one weighted promotion quality value.

Step 240 includes calculating a promotion value of the electronic media files based on a product of the weighted values. In one example, the weighted values determined in Step 230 may be multiplied directly to determine the promotion value. In another example, the weighted values may be applied as part of a linear or non-linear function to determine the promotion value. In one example, the product of the weighted values may be calculated separately for each individual electronic media file, then summed to determine a total promotion value. In another example, the product of the weighted values may be calculated separately for each type of electronic media file, then summed. In another example, the product of the weighted values may be determined by vector or matrix multiplication rules.

The promotion value may be communicated by the computer to a user, database, or report. As discussed relative to FIG. 1A above, the promotion value may be used for further analysis, for example, to track promotion value over time or across media platforms. Additionally, the process may be performed partially in reverse in order to determine areas where improvements may correspond to increased or desired promotion values.

The method may further include any other features, components, or functions disclosed relative to any other figure of this disclosure.

The method may be further illustrated by the following operating examples:

As an example, promotion quality may be used to determine an adjusted advertisement value. For instance, adjusted advertisement value may be calculated as the product of a maximum potential advertisement value and the promotion quality as determined above. The maximum potential advertisement value may be the maximum potential value the promotion may provide to the entity. It may be determined by the number and type of interactions on an electronic media post (such as likes, comments, shares, views, impressions, and the like), as well as the cost per engagement, which may be derived from the actual cost of the electronic media post.

As an example, the input values for the method may be calculated using additional information. This additional information may include a valuation model, competition and crowding, retention graphs, longform downweighting, impressions and video view predictions, sponsorship predictions, promoted tag predictions and identification, docker containers for machine learning, and sentiment analysis.

As an example, the method may be implemented as a valuation model. The valuation model may be made up of maximum advertisement value (MAV), promotion quality, and adjusted advertisement value. MAV is determined by the number and type of interactions on a post (likes, comments, shares, views, impressions) multiplied by the Cost Per Engagement (CPE) that is derived from the cost of actual social ad campaigns which may be determined from a 3rd party. Each engagement type receives a different amount of value, e.g., $0.10 per like, $2.00 per comment, etc. Market-rate values may be determined using an API that connects to a $3^{rd}$ party's rate data and takes a 30-day trailing average to ensure there are no sudden jumps in value. An electronic media file's MAV may then calculated according to the CPE values recorded for the day the media was posted. Promotion quality is made up of both text and logo promotion quality. For each, we are considering the factors below. Any factors that have not already been described above are described in more detail in subsequent sections, including Size/coverage, position/location, clarity, exposure duration, viewership during that exposure, and competition and crowding. Adjusted Ad Value (AAV) may be the final value reported. The promotion quality value acts as a downweight of MAV, and so AAV is calculated by multiplying the MAV by the Promotion Quality. Promotion quality calculation is in the case of long-form media, such as Twitch live streams, which are valued slightly differently due to their differing nature. Such calculations may be illustrated, as an example, by the following code:

```
def get_value(self):
    """Returns all valuation metrics for a social post"""
    if self.status < 1:
        self.set_post_stats( )
        base_value = self.get_base_value( )
        text_quality = self.get_text_quality( )
        logo_quality = self.get_logo_quality( )
        if (text_quality + logo_quality) > 0:
            if (text_quality + logo_quality) == 2:
                promotional_quality = 1
            else:
                promotional_quality = 1 / (1 + np.exp(-3.5 *
                    (text_quality + logo_quality) + 3))
        else:
            promotional_quality = 0
        full_value = base_value * promotional_quality
        # Set attributes
        self.base_value = base_value
        self.text_quality = text_quality
        self.logo_quality = logo_quality
        self.promotional_quality = promotional_quality
        self.value = full_value
        self.status = 2
        return self
```

Competition & Crowding:

One of the inputs to the model may include the amount of competition and crowding there is amongst promotional features. For instance, the presence of different commercial brand logos in an image leads to competition for a viewer's attention. In the case of text media, the use of multiple promotional hashtags or mentions may make it more difficult for a viewer to focus on what brands in particular are being promoted. In order to calculate competition and crowding, an entire image may be examined for the presence of any logos. The coverage and clarity of each of the logos may be determined, and a weight ratio calculated of the commercial brand's presence in the image compared to any off-brand presence. For videos, a similar process may be used on a frame-by-frame basis. For text media, each of the text features may first be weighted in terms of their position and feature type (e.g. hashtag, mention, embedded text, etc.). The ratio of the brand-to-be-valued's presence text features may be computed compared to either non-branded or other-branded text features.

Retention Graph:

Based on the actual viewing data of videos in the system, consistent patterns of audience viewing behavior may emerge depending on a variety of factors, including the social network the video was posted on, as well as characteristics of the post and the poster. This data may provide a basis for predicting viewing behavior during videos where retention data was not available. For example, the predicted viewing behavior on a specific social network whereby the proportion of total viewers still watching a video after a time period t (in seconds) can be described using the following function:

$$view_t = \begin{cases} 1 \text{ if } 0 \leq t \leq 2 \\ \frac{1}{at+b} + c \text{ if } t > 2 \\ [a, b, c] = [\ 0.19462627,\ 0.55009431,\ 0.0250621\ ] \end{cases}$$

Long Form Downweighting:

In the case of long-form videos, where a brand indicator may be consistently on the screen for hours at a time (e.g. a watermark in the corner, or a product placed prominently in the frame), values may be down-weighted over time to account for diminishing attention focused on that brand indicator by the viewer. These long-form videos are often live-streamed, meaning that different viewers will come in and out of the stream at different points in time. In such cases, this down-weighting will occur in cycles to account for new viewers entering and exiting the stream. For example, if a brand's logo is consistently on screen for an entire hour, the weight of that logo will continually to gradually diminish up to a 5 minute period, where the down weighting function is this reset to account for new viewers. These down weighting cycles will continue to occur every 5 minutes up until the hour of exposure is complete. As an exemplary illustration, long form downweighting may be implemented in software as follows:

```
def get_long_downweight(self, det_duration):
    """Checks for number of thirty seconds spots. If detection is over thirty seconds, down-
    weight"""
    #set initial length to 0
    new_base = 0
    spot_length = 30
    detection_length = det_duration
    #get number of thirty second spots and base integer and fraction
    spot_count = detection_length/spot_length
    spot_ints = int(detection_length/spot_length)
    spot_frac = detection_length/30 - spot_ints
    #Polynomial downweight function coefficients for long detections
```

```
poly_downweight = [-0.0003934,0.0077214,-0.0356206,-0.12213578, 1.000]
p = np.poly1d(poly_downweight)
#first check if under 30 seconds (under 1 spot)
if spot_count < 1:
    if detection_length < 2: #don't include detections less than 2 seconds in length
        new_base = 0
    else:
        new_base = spot_count * 30 #put in seconds
#check if spot is under 5 minutes (equal to 10, 30 second spots)
elif spot_ints < 10:
    For i in range(0,spot_ints):
        base = 0
        base = p(i)*spot_length
        new_base = new_base+base
    new_base = new_base + (p(spot_ints)*spot_ints)*spot_frac
#if spot is over 5 minutes, then the downweighting will reset after each five minute portion
elif spot_ ints >=10:
    for t in range (0, int(spot_ints/10)):
        for i in range(0,10):
            base = 0
            base = p(i)*spot_length
            new_base = new_base+base
    for i in range(0,spot_ints - (int(spot_ints/10)*10)):
        base = 0
        base = p(i)*30
        new_base = new_base+base
    new_base = new_base + p(spot_ints - (int(spot_ints/10)*10))*spot_frac
#transform into total number of 30 second spots
new_spots = new_base/spot_length
return new_spots
```

Impressions estimator.

An impressions estimator takes in a series of features, including post interactions, presence of hashtags or mentions, and characteristics about the poster and the post itself, in order to estimate how many impressions a social media post is likely to have received. A model was generated via a gradient boosted regression tree, which is robust in cases of missing data or imbalanced regressors. The model was generated using 7,000 tree iterations with a maximum depth of 12, and a minimum split sample size of 50. The model was trained and validated using 850,000 samples, with 80% of the samples used for training, and 20% used for validation.

Sponsorship Predictor:

The sports ecosystem is constantly changing: a brand that sponsors a team one year may opt for a different team the next year. Rosters are continually being updated as athletes trade from one team to the next. This makes it difficult to remain up-to-date on who sponsors who. By mining the data from a tracked ecosystem, relationships between entities may be predicted by examining how different entities engage with one another through their online presence. This presence results in a number of signals that may be used to predict such relationships such as how often an entity mentions or talks about another entity (and whether that conversation is reciprocated), how recently these mentions have occurred (e.g., if the two entities stop interacting with one another online, this might index a break in the relationship), or the sentiment of these conversations (e.g., conversations that indicate negativity toward another entity are unlikely to be the result of a current partnership). Based on confirmed partnerships, it is possible to assess trends in frequency of mentions, recency of mentions, and the sentiment of the conversation around these mentions. This data may be used to train a model that takes in a number of features (e.g., frequency, recency, sentiment, etc.) and predicts the probability that there is a partnership between two entities. This may be illustrated in the following software code configured to pull get data to input to model for prediction:

```
Insert into #PotentialPromotedPosts (SocialPost_ID, PosterMember_ID, PosterMemberType, PosterMemberSponsorEntityType, CreatedDate,
    PromotedMember_ID, PromotedMemberType, PromotedMemberSponsorEntityType, PromotedTag, PostDateBucket, MentionValue)
    select SocialPost_ID, PosterMember_ID, PosterMemberType, PosterMemberSponsorEntityType, CreatedDate, PromotedMember_ID
    |  | ,PromotedMemberType, PromotedMemberSponsorEntityType, PromotedTag, PostDateBucket
    |  | ,ISNULL{{select MentionValue from SocialPostValuation where SocialPost_ID = promoted_posts.SocialPost_ID and Brand_ID =
        promoted_posts.PromotedMember_ID}, 0} as MentionValue
    from {
    |  select
    |  | p.member_id as PosterMember_id,
    |  | s1.type as PosterMemberType,
    |  | s1.SponsorEntityType as PosterMemberSponsorEntityType,
    |  | p.socialPost_id as SocialPost_id,
    |  | p.createdDate as CreatedDate,
    |  | m.member_id as PromotedMember_id,
    |  | s2.type as PromotedMemberType,
    |  | s2.SponsorEntityType as PromotedMemberSponsorEntityType,
    |  | t.tag as PromotedTag,
```

```
|   |   case
|   |   | when p.createdDate <= @ReportDate and p.createdDate > DATEADD(DAY,-@Bucket1Days,@ReportDate) then 1
|   |   | when p.createdDate <= DATEADD(DAY,-@Bucket1Days,@ReportDate) and p.createdDate >
          DATEADD(DAY,-@Bucket2Days,@ReportDate) then 2
|   |   | when p.createdDate <= DATEADD(DAY,-@Bucket2Days,@ReportDate) and p.createdDate >
          DATEADD(DAY,-@Bucket3Days,@ReportDate) then 3
|   |   | else 4 end as PostDateBucket
|   from socialPostTags t
|   | inner join {
|   |   | select member_id, tag
|   |   | from mapSocialPromotionTags
|   |   | where tagType = 2
|   |   | and member_id is not null
|   |   | group by member_id, tag
|   | } m on t.tag = m.tag
|   | inner join socialPosts p on t.socialPost_id = p.socialPost_id
|   | inner join #SponsorEntities s1 on p.member_id = s1.member_id
|   | inner join #SponsorEntities s2 on m.member_id = s2.member_id
|   where t.tagType = 2
|   and p.createdDate >= DATEADD(DAY,-@TotalDays,@ReportDate)
|   and p.createdDate < @ReportDate
|   and p.member_id in (select distinct member_ID from #SponsorEntities)
|   and p. member_id <> m.member_id
|   and s1.SponsorEntityType <> s2.SponsorEntityType
|   } promoted_posts;
```

Sentiment Analyzer:

For both sponsorship predictions and the valuation model, understanding the context of the text describing a piece of media content may be important. While a number of tools exist to extract the sentiment (e.g. positive, negative, neutral) of text content, these are often trained on more general uses of the language. As a result, they are often not built to deal with expressions used in the sports ecosystem and in many cases, wrongly categorize many metaphors that are used in sports as negative when they should be considered positive, or vice versa. To ensure the text data has a more accurate sentiment score, a model was trained based on a large set of manually categorized text descriptions that include a variety of sport-specific metaphors and acronyms, as well as general slang that is often used to talk about the outcomes of sporting events. For instance, "The Warriors are KILLING IT!!!" Is typically classified as a negative sentence, but in the context of sports, it may be a positive statement. Additionally, acronyms such as "NFC", which are used often in football to talk about leaders of the NFC, carry another meaning outside of football that is considered strongly negative. As a result, text descriptions like "Who's your NFC pick?" or "SICKEST TEAM IN THE NFC!" are considered negative due to other slang meanings of the acronym. Based on our manual categorizations of thousands of text descriptions, the model is better able to deal with this type of language and thus is more accurate in the context of determine whether a piece of media should be considered positive promotion (which could be considered more valuable) or negative promotion (which could be considered less valuable).

Promoted Tag Identification:

Beyond specifically calling out a brand using an @ mention, promotion can be generated for a brand through the use of brand-related hashtag campaigns. While in some cases the hashtags specifically identify the brand (e.g., #nike), in other cases the hashtags are phrases that the audience associates with the brand (e.g., #justdoit). In order to ensure tracking of the most potential text value driven to a brand, it may be important to identify what hashtags are linked to a brand during a particular time period. Using a version of TF-IDF, we determine which hashtags are most likely to be associated with a brand while at the same time filtering out hashtags that may just be widely used across many accounts. TF-IDF takes into account what hashtags are being used across the social media world, as well as what hashtags are being used by particular accounts. This allows common hashtags that appear often to be downweighted while giving more weight to hashtags which might be overall less frequently used in the entire world of hashtag use, but tend to be used frequently by a few accounts (or by accounts that have other factors in common, such as mentioning a particular brand).

Docker Containers for Machine Learning Models:

In order to ensure the above models can be run consistently and independent of infrastructure, a number of Docker Images were created, which are run on an AWS Fargate Serverless ECS Container. The Docker Images contain the model files, as well as Python scripts to run a Flask API to send a list of features as inputs to the model in order to receive the predicted value.

Example Payload as Input to Model:

```
{
    "data": [
        [50, 100, 150, 1000, 5000, 1, 2, 0, 1, 0, 0, 0, 0, 1,
        0, 0, 0, 1, 0, 0, 0, 0],
        [50, 100, 150, 1000, 5000, 1, 2, 0, 1, 0, 0, 0, 0, 1,
        0, 0, 0, 1, 0, 0, 0, 0]
    ]
}
```

Example Model Output:

```
{
    "prediction": {[12000, 12500]}
}
```

Figure 3:
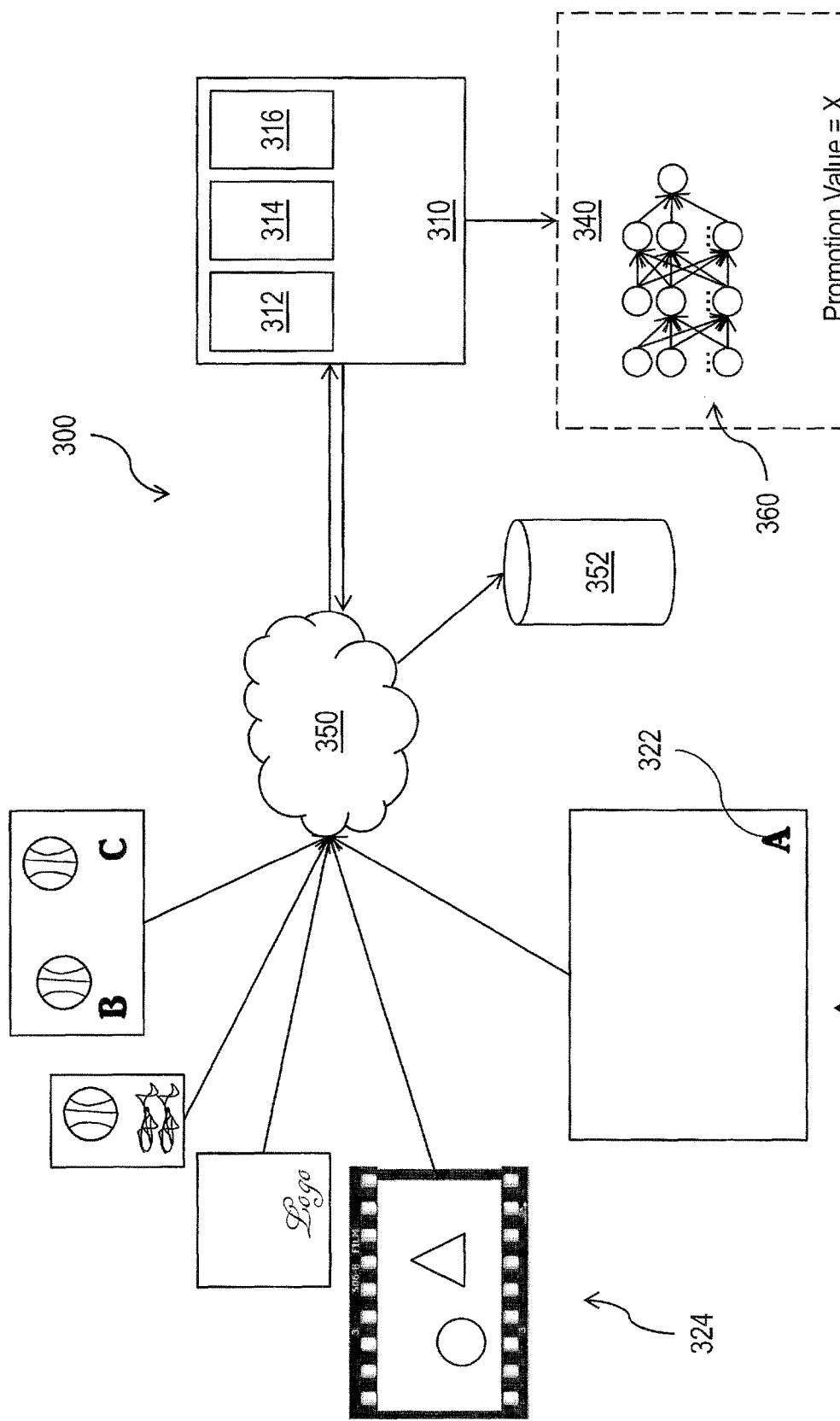
FIG. 3 shows a schematic diagram of a system for determining a promotion quality of a logo in visual media, in accordance with a third exemplary embodiment of the present disclosure.

FIG. 3 shows a schematic diagram of a system 300 for determining a promotion quality of a logo in visual media, in accordance with a third exemplary embodiment of the present disclosure. The system 300 comprises a remote computer device 310, at least one visual media file 320, and a logo recognition application 340. The at least one visual media file 320 is electronically accessible over at least one network system 350 by the remote computer device 310. The logo recognition application 340 is hosted at least partially on the remote computer device 310 and comprises a neural network 360 trained to detect and identify a logo 322 in a visual media file. The logo recognition application 340 detects a logo 322 within the at least one visual media file 320, identifies the logo 322, determines a promotion quality of the logo 322 by applying weighted values to at least one of: a size, a location, a visibility, and an exposure duration of the logo 322, and reports the promotion quality of the logo 322.

The remote computer device 310 may include the computer devices described relative to FIG. 1A. The remote computer device 310 may comprise components common to computer devices, such as a power source 312, computer-readable memory 314, and processor 316, among others. The remote computer device 310 may be connected to a network system 350, such as the Internet, and may access social media sites, news outlets, and other web content through the network system 350.

The visual media file 320 may be any of the visual media files described relative to FIG. 1A, such as images, photographs, gifs, videos, and social media posts containing visual media elements. Visual media files 320, 324 may be accessible by the remote computer device 310 over the network system 350.

The logo 322 may include any team logo, brand logo, graphic mark, image, or other visual indication of the source of a commercial brand. Additionally, a logo may include a product, such as a distinctive soccer ball, athletic shoe, or any other object that may be visually identified. In this disclosure, when reference is made to the term "logo", it may be inclusive of any logos, products or similar objects.

The logo recognition application 340 is hosted at least partially on the remote computer device 310. The logo recognition application 340 (hereinafter "application 340") uses a neural network to detect and identify a logo 322 in the visual media file 320. The input layer vector of the neural network may be determined based on a data set. The neural network may be any type of neural network, including a feedforward neural network, a deep neural network, a convolutional neural network, and the like. Multiple types of neural networks may be used in logo recognition depending on the type of file, nature of the post, or other factors.

The neural network may be trained using a repository of relevant athletic logos, color schemes, photos, videos, and other visual sources. The neural network may be trained to recognize logos in a variety of locations, orientations, and scenarios. For example, the neural network may be trained to recognize logos overlaid as graphics, which may be prominently displayed and located in key visual areas of the media files. The neural network may also be trained to recognize logos on apparel, equipment, signage, buildings, and the like. These logos may be oriented in a number of directions, obscured by other subjects, fast-moving, or otherwise difficult to detect. The neural network may be fed training files covering a wide variety of locations, orientations, and scenarios to provide robust detection data.

When trained, the application 340 detects a logo 322 within the at least one visual media file 320, identifies the logo 322, and determines a promotion quality of the logo 322 by applying weighted values to at least one logo characteristic value. The logo characteristic values may be numerical values assigned to the visual media file 320 by the application 340. These numerical values may be determined based on the application 340's determination of the quality of each logo characteristic. In one example, logo characteristics may include a size, a location, a visibility, and an exposure duration of the logo. Logo characteristics may include the qualities discussed relative to FIG. 1A, above. For example, the size characteristic may include the absolute and relative sizes of the logo 322 within the visual media file 320. This may include the logo 322 itself, or it may include any additional subject to which the logo 322 is affixed, such as uniforms, banners, tents, walls, and the like. The application 340 may determine whether the size of the additional subject adds value to the overall appearance of the logo 322 within the visual media file 320. The location characteristic may include the absolute and relative locations of the logo 322 within the visual media file 320. This may include the location of the logo 322 itself, or it may include any additional subject to which the logo 322 is affixed. For example, a banner placed in a prominent location that leads a viewer to the logo 322 may result in a higher value. The visibility characteristic may include clarity, contrast, obstructions, and noise or competition. Additionally, the visibility characteristic may decide a value based on whether the logo 322 has been added to the visual media file 320 as a graphic or overlay, for instance, as part of a filter or during a news segment. The exposure duration characteristic may include the length of the logo 322's exposure in a video file or how long an image having the logo 322 is generally viewed by a viewer. Other characteristics may be considered by the application 340 as well.

The characteristics may receive a numerical value based on one or more of the factors discussed above. The characteristic values may be weighted by the application 340 based on their importance in determining the promotion quality. For instance, the visibility characteristic may receive a heavier weight than the location characteristic for some files. For other files, the exposure characteristic may receive a heavier weight than the visibility characteristic. The weights may change depending on the type or platform of visual media file, the nature of the logo, or other factors. The weights may be determined by the application 340 or by a user of the system 300. The weights may be updated over time as different characteristics become more or less important in determining the promotion quality of the logo 322.

The promotion quality of the logo 322 may be determined as a product of the weighted characteristic values considered by the system 300. In one example, each of the exemplary characteristic values may be considered, weighted, and directly multiplied together in order to determine the promotion quality of the logo 322. In another example, each of the exemplary characteristic values may be weighted and applied to a mathematical formula or series of operations to determine the promotion quality.

After determining a promotion quality of the logo, the system 300 reports the promotion quality to a user, database 352, report, or other interested party. In one example, the promotion quality may be considered with other factors, such as cost, engagement quality, and the like, in order to determine a promotion value. In another example, the promotion quality may be reverse analyzed to allow a user to determine which characteristics may be altered in order to achieve a desired promotion quality.

The application 340 may be a software program, executable file, mobile application, or web interface, and may have the same features discussed relative to Step 170 in FIG. 1A, above. The application 340 may include a graphical user interface (GUI) that allows a user to navigate through and manipulate the system 300. In one example, the application 340 may allow a user to upload a logo 322 or visual media file 324 for training and identification. In another example, the user may request a promotion quality determination be made. The user may select the constraints of the promotion quality determination, including the type of visual media files to be considered, the type of logo or other brand indicator to be identified, date ranges to search, geographic locations to identify, trends to follow, and the like. The user may request multiple promotion quality determinations be made for any of these constraints. For example, the user may request promotion quality determinations for a single social media post, but separated based on geographic location. This may allow users to determine the promotion quality according to demographic or other characteristics. In another example, a user may use the application 340 to track the promotion quality of multiple logos 322 or multiple visual media files 324 over a period of time. It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented process, comprising the following steps:

training a deep neural network to determine promotional value for brands using a training data set with visual and audio media having known promotional brand values;

searching with a processor of a computing device, on a connected network, a plurality of websites for data corresponding to digital electronic media files;

parsing the data returned from the search to determine a plurality of digital electronic media files containing data corresponding to at least one entity identifier;

identifying the plurality of digital electronic media files each containing data corresponding to at least one entity identifier, wherein the digital electronic media files include at least one visual media file and at least one audio media file, wherein the at least one entity identifier within the at least one visual media file includes at least one entity logo, wherein a logo recognition application hosted within a computer device uses the deep neural network to detect and identify the at least one entity logo within the at least one visual media file, and wherein the deep neural network uses a computer vision program to detect at least a size and clarity of the at least one entity logo within the at least one visual media file, and wherein the at least one entity identifier within the at least one audio media file includes at least one audio brand indicator, wherein the application hosted within the computer device uses the deep neural network to detect and identify the at least one audio brand indicator within the at least one audio media file;

parsing the data corresponding to at least one entity identifier to determine at least one context for each of the at least one entity identifiers;

mapping each entity identifier context to a feature vector;

mapping each feature vector to an input layer of the deep neural network;

mapping the input layer to a plurality of hidden layers of the deep neural network;

generating a promotional value model by learning weights for each of a plurality of transitions between the layers of the deep neural network, such that the learned weights indicate a relative value between the layers, wherein the promotional value model is configured to determine a promotional value of a commercial brand of the entity learned through the deep neural network; and reporting the determined promotional value of the commercial brand of the entity.

2. A computer-implemented process, comprising the following steps:

training a deep neural network to determine promotional value for brands using a training data set with visual and audio media having known promotional brand values;

identifying a plurality of digital electronic media files each containing at least one commercial brand indicator, wherein the plurality of digital electronic media files includes at least one visual media file and at least one audio media file, wherein the at least one commercial brand indicator within the at least one visual media file includes at least one logo, wherein a logo recognition application hosted within a computer device uses the deep neural network to detect and identify the at least one logo within the at least one visual media file, and wherein the deep neural network uses a computer vision program to detect at least a size and clarity of the at least one logo within the at least one visual media file, and wherein the at least one commercial brand indicator within the at least one audio media file includes at least one audio brand indicator, wherein the application hosted within the computer device uses the deep neural network to detect and identify the at least one audio brand indicator within the at least one audio media file;

determining at least one context for each of the at least one commercial brand indicators;

mapping each brand indicator context to a feature vector;

mapping each feature vector to an input layer of the deep neural network;

mapping the input layer to a plurality of hidden layers of the deep neural network;

generating a promotion value model by learning weights for each of a plurality of transitions between the layers of the deep neural network, such that the learned weights indicate a relative value between the layers, wherein the promotion value model is configured to determine a promotion value of the at least one commercial brand learned through the deep neural network; and reporting the determined promotion value.

3. The process of claim 2, wherein the plurality of digital electronic media files are at least one selected from the set of: visual, audio, and text files.

4. The process of claim 2, wherein the plurality of digital electronic media files comprise at least one social media post.

5. The process of claim 4, wherein the step of identifying a plurality of digital electronic media files comprises searching a social media site by at least one selected from the set of: account name, hashtag, mention, event logo, and keyword.

6. The process of claim 2, wherein the at least one commercial brand indicator is at least one selected from the set of: a logo, a mention, an embedded mention, and a hashtag.

7. The process of claim 2, wherein the at least one context further comprises at least one selected from the set of: file type, size, location, visibility, exposure, and cost.

8. The process of claim 2, wherein the deep neural network learns the weights using back-propagation algorithms.

* * * * *